(12) United States Patent
Abe et al.

(10) Patent No.: US 11,794,704 B2
(45) Date of Patent: Oct. 24, 2023

(54) VEHICULAR OPERATION PEDAL DEVICE

(71) Applicant: TOYODA IRON WORKS CO., LTD., Aichi (JP)

(72) Inventors: Junya Abe, Aichi (JP); Takuya Katayama, Aichi (JP)

(73) Assignee: TOYODA IRON WORKS CO., LTD., Aichi (JP)

( * ) Notice: Subject to any disclaimer, the term of this patent is extended or adjusted under 35 U.S.C. 154(b) by 270 days.

(21) Appl. No.: 17/296,333

(22) PCT Filed: Jul. 30, 2019

(86) PCT No.: PCT/JP2019/029727
§ 371 (c)(1),
(2) Date: Jan. 24, 2022

(87) PCT Pub. No.: WO2020/121589
PCT Pub. Date: Jun. 18, 2020

(65) Prior Publication Data
US 2022/0219653 A1 Jul. 14, 2022

(30) Foreign Application Priority Data
Dec. 11, 2018 (JP) ................. 2018-231493

(51) Int. Cl.
*B60T 7/06* (2006.01)
*G05G 1/30* (2008.04)
(Continued)

(52) U.S. Cl.
CPC .............. *B60T 7/065* (2013.01); *B60R 21/09* (2013.01); *G05G 1/32* (2013.01)

(58) Field of Classification Search
CPC  G05G 1/30; G05G 1/32; G05G 1/323; G05G 1/327; G05G 1/44; B60T 7/06; B60T 7/065; B60R 21/09; B60R 2021/0004
See application file for complete search history.

(56) References Cited

U.S. PATENT DOCUMENTS 6,964,212 B2  11/2005 Ji
7,415,909 B2 *  8/2008 Miyoshi ................. B60R 21/09
60/554
(Continued)

FOREIGN PATENT DOCUMENTS

CN    1522909 A    8/2004
CN    1676377 A    10/2005
(Continued)

OTHER PUBLICATIONS

Office Action dated Apr. 1, 2022 for the corresponding Chinese Patent Application No. 201980077234.7.
(Continued)

*Primary Examiner* — Adam D Rogers
(74) *Attorney, Agent, or Firm* — Pearne & Gordon LLP

(57) ABSTRACT

A brake pedal device includes: a pedal bracket fixed to a dash panel; an operation pedal mechanism having a step portion rotatable with respect to the pedal bracket and in which the step portion is stepped forward of a vehicle; a rotating member having a bent portion, a front end portion, and an upper end portion, and rotatably supported with respect to the operation pedal mechanism by a rotating shaft portion at the bent portion; a connecting pin and a clevis that rotatably hold a tip portion of an operating rod projecting rearward of the vehicle from the dash panel with respect to the rotating member, at the front end portion of the rotating member; and a caulking pin that fixes the rotating member and the operation pedal mechanism, at the bent portion of the rotating member.

4 Claims, 12 Drawing Sheets

(51) Int. Cl.
*B60R 21/09* (2006.01)
*G05G 1/32* (2008.04)

(56) References Cited

U.S. PATENT DOCUMENTS

| | | | |
|---|---|---|---|
| 9,429,976 | B2 | 8/2016 | Taguchi |
| 9,821,777 | B2 | 11/2017 | Uchida et al. |
| 9,981,638 | B2 * | 5/2018 | Kawazu ................ G05G 1/327 |
| 10,384,656 | B2 | 8/2019 | Tsuguma et al. |
| 11,092,992 | B2 * | 8/2021 | Kato ....................... B60T 7/065 |
| 11,377,078 | B2 * | 7/2022 | Katayama ............. G05G 1/327 |
| 2004/0159176 | A1 | 8/2004 | Ji |
| 2005/0217264 | A1 | 10/2005 | Miyoshi et al. |
| 2006/0162481 | A1 * | 7/2006 | Sato ........................ B60T 7/065 74/512 |
| 2010/0147101 | A1 | 6/2010 | Yamazaki |
| 2014/0352484 | A1 | 12/2014 | Taguchi |
| 2016/0244033 | A1 | 8/2016 | Uchida et al. |
| 2016/0347291 | A1 | 12/2016 | Tsuzuki et al. |
| 2017/0101079 | A1 | 4/2017 | Kawaguchi et al. |
| 2018/0281756 | A1 | 10/2018 | Tsuguma et al. |

FOREIGN PATENT DOCUMENTS

| | | | | |
|---|---|---|---|---|
| CN | 102371978 | A * | 3/2012 | ............ B60R 21/09 |
| CN | 104024969 | A | 9/2014 | |
| CN | 105905084 | A | 8/2016 | |
| CN | 105934377 | A | 9/2016 | |
| EP | 1 512 596 | A1 | 3/2005 | |
| JP | 2005-285066 | A | 10/2005 | |
| JP | 2008-204096 | A | 9/2008 | |
| JP | 2011037309 | A * | 2/2011 | |
| JP | 2015-072504 | A | 4/2015 | |
| WO | WO-03045750 | A1 * | 6/2003 | ............ B60R 21/09 |
| WO | 2015-145640 | A1 | 10/2015 | |
| WO | 2016-121154 | A1 | 8/2016 | |
| WO | 2017/006628 | A1 | 1/2017 | |
| WO | 2017/043144 | A1 | 3/2017 | |

OTHER PUBLICATIONS

International Search Report dated Sep. 17, 2019 issued in PCT Application No. PCT/JP2019/029727.
European Search Report dated Sep. 12, 2022 for the corresponding European Patent Application No. 19897474.3.

* cited by examiner

VEHICULAR OPERATION PEDAL DEVICE

TECHNICAL FIELD

The present invention relates to a vehicular operation pedal device that suppresses a step portion of an operation pedal mechanism from moving back to a vehicle rear side when a vehicle component is displaced to the vehicle rear side due to a vehicle collision (hereinafter, it is referred to as "prevention of backward movement of the step portion of the operation pedal mechanism at the time of the vehicle collision").

BACKGROUND ART

Conventionally, various techniques have been proposed for the vehicular operation pedal device that prevents the backward movement of the step portion of the operation pedal at the time of the vehicle collision.

For example, a vehicular brake pedal device described in PATENT LITERATURE 1 below is mounted on a vehicle and includes a pedal bracket, a brake arm, a connecting arm, a rotating arm, and a fixing mechanism. The pedal bracket is fixed to a partition wall that separates a vehicle front side of a passenger compartment. In this case, the partition wall typically separates an engine room or a vehicle front space corresponding to the engine room from the passenger compartment. The brake arm is rotatably supported by the pedal bracket and includes a brake pedal pad for braking operation. The connecting arm is rotatably supported by the pedal bracket and functions to connect a push rod of a brake booster and the brake arm in order to drive the push rod of the brake booster that applies a braking force to wheels in conjunction with rotation of the brake arm. In this case, the push rod is driven via the connecting arm by a pedaling force of a driver acting on the brake pedal pad. The rotating arm is rotatably supported by the connecting arm so as to press the push rod in a direction intersecting a rod axial direction by a predetermined load received when a vehicle front-rear direction distance between the partition wall and a vehicle body component disposed in the rear of the vehicle from the partition wall changes at the time of the vehicle collision and the rotating arm comes into contact with the vehicle body component. The fixing mechanism has a function of fixing the rotating arm to the connecting arm when the load received by the rotating arm is less than a predetermined load, while releasing fixation of the rotating arm when the load received by the rotating arm reaches the predetermined load.

According to the brake pedal device having the above configuration, the fixing mechanism fixes the rotating arm to the connecting arm in a state where the vehicle collision does not occur, typically in a normal time such as when operating a brake or transporting a product. Therefore, the fixing mechanism prevents the rotating arm from operating on the connecting arm at normal times due to rattle between the connecting arm and the rotating arm. Typically, the rotating arm is prevented from being slightly displaced in at least one direction of a circumferential direction and an axial direction of its connecting shaft. On the other hand, at the time of the vehicle collision, the rotating arm can be rotated by releasing the fixation of the rotating arm to the connecting arm, and the rotating arm in contact with the vehicle body component presses the push rod in the direction intersecting the rod axis direction. Thus, it is possible to suppress the backward movement of the brake pedal due to the load received from the connecting arm at the time of the vehicle collision. As a result, by using the fixing mechanism, it is possible to properly operate the mechanism for suppressing the backward movement of the brake pedal only at the time of the vehicle collision.

CITATION LIST

Patent Literature

PATENT LITERATURE 1: JP-A-2015-072504

SUMMARY OF INVENTION

Problems to be Solved by Invention

However, in the vehicular brake pedal device described in PATENT LITERATURE 1, the number of parts constituting the rotating arm and the fixing mechanism required to suppress the backward movement of the brake pedal at the time of the vehicle collision has been large.

Therefore, the present invention has been made in view of the above points, and an object of the present invention is to provide a vehicular operation pedal device having a small number of parts required for preventing the backward movement of the step portion of the operation pedal mechanism at the time of the vehicle collision.

Solution to Problems

One embodiment of the present disclosure is directed to a vehicular operation pedal device comprising: a support member fixed to a first vehicle component; an operation pedal mechanism provided in the support member and having a step portion rotatable with respect to the support member, and in which the step portion is stepped forward of a vehicle; a rotating member having a bent portion, a front end portion extending forward of the vehicle from the bent portion, and an upper end portion extending upward from the bent portion, and rotatably supported with respect to the operation pedal mechanism by a rotating shaft portion at the bent portion; a connecting portion that rotatably holds an input portion of a vehicular control mechanism projecting rearward of the vehicle from the first vehicle component with respect to the rotating member, at the front end portion of the rotating member; and a fixing member that fixes the rotating member and the operation pedal mechanism at the bent portion of the rotating member, and to which a first load is applied when the step portion of the operation pedal mechanism is fully stepped forward of the vehicle, wherein an amount of operation by stepping on the step portion is transmitted to the vehicular control mechanism via the rotating member and the connecting portion, when the first vehicle component is displaced rearward of the vehicle at the time of a vehicle collision, the upper end portion of the rotating member comes into contact with a second vehicle component disposed rearward of the vehicle from the first vehicle component, so that a second load is applied to the fixing member, and when the second load is greater than the first load, fixation of the rotating member and the operation pedal mechanism by the fixing member is released, the upper end portion of the rotating member is rotated forward of the vehicle about the rotating shaft portion, and the front end portion of the rotating member and the input portion of the vehicular control mechanism are displaced downward via the connecting portion, so that the step portion of the operation pedal mechanism is displaced forward of the vehicle with respect to the first vehicle component.

In one embodiment of the present disclosure, the input portion of the vehicular control mechanism is a tip portion of an operating rod, and controls the vehicle by being displaced in an axial direction of the operating rod by an operating load on the step portion, and the rotating shaft portion is disposed on an axis of the operating rod.

In one embodiment of the present disclosure, the operation pedal mechanism comprises: an operation pedal that is rotatably supported with respect to the support member by an operating shaft portion provided at an upper end portion of the operation pedal and is provided with the step portion at a lower end portion of the operation pedal; and an intermediate lever that is rotatably supported with respect to the support member by an intermediate shaft portion provided at a lower end portion of the intermediate lever, and is provided with the rotating shaft portion and the fixing member at an upper end portion of the intermediate lever, in which an intermediate portion of the intermediate lever is connected to the operation pedal by a link member, between the upper end portion and the lower end portion of the operation pedal.

In one embodiment of the present disclosure, the operation pedal mechanism comprises an operation pedal that is rotatably supported with respect to the support member by an operating shaft portion provided at an upper end portion of the operation pedal, is provided with the step portion at a lower end portion of the operation pedal, and is provided with the rotating shaft portion and the fixing member between the upper end portion and the lower end portion.

In one embodiment of the present disclosure, the fixing member is a caulking pin that restricts rotation of the rotating member with respect to the operation pedal mechanism by caulking while being inserted through a mounting hole provided in the operation pedal mechanism and a mounting hole provided in the rotating member.

In one embodiment of the present disclosure, the fixing member comprises: a bolt inserted into an elongated hole formed along an arc about the rotating shaft portion at the bent portion of the rotating member; and a nut screwed into the bolt.

Effects of Invention

The vehicular operation pedal device of the present invention has a small number of parts required for preventing the backward movement of the step portion of the operation pedal mechanism at the time of the vehicle collision.

DESCRIPTION OF EMBODIMENTS

Figure 1:
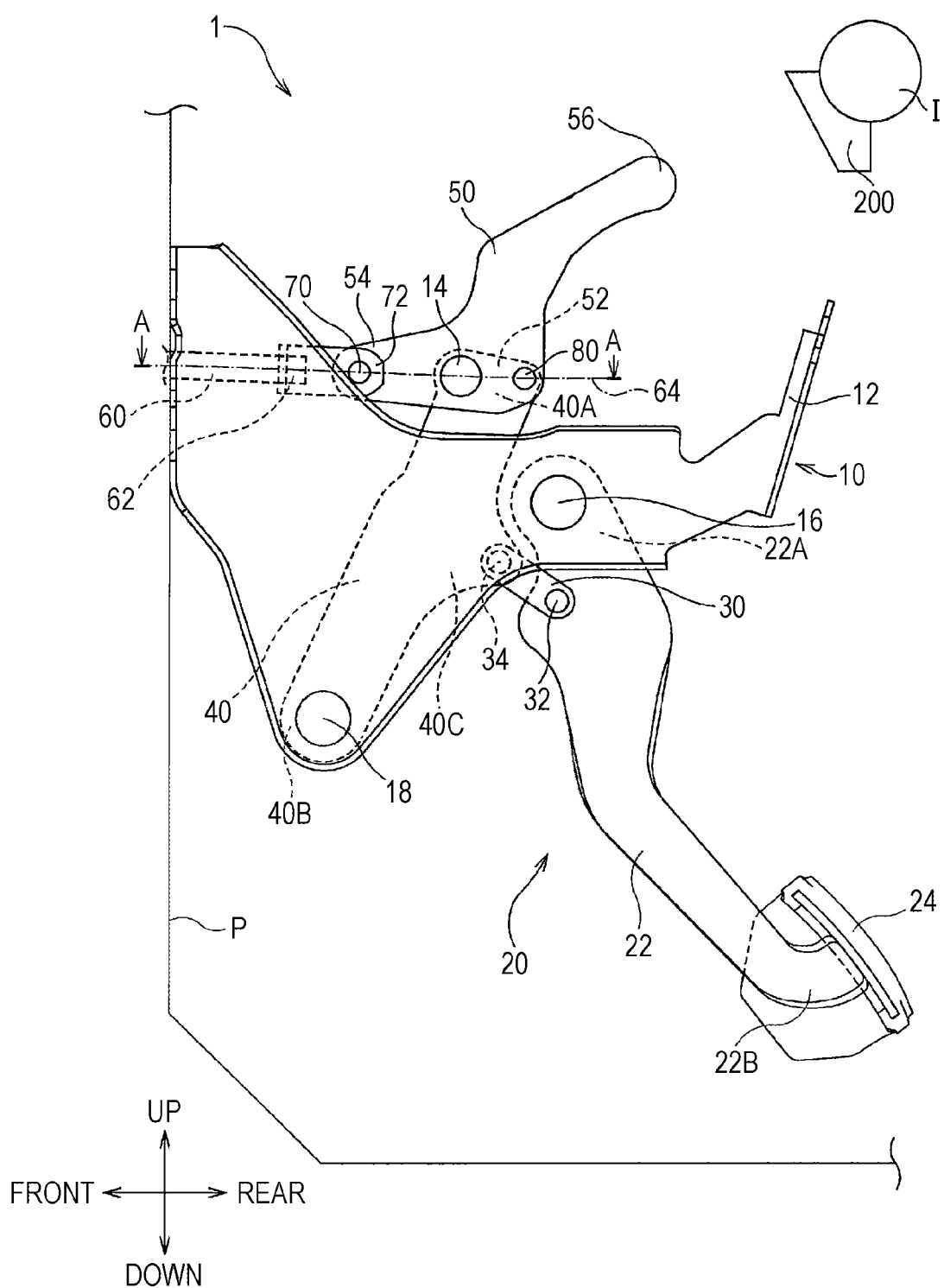
FIG. 1 is a side view illustrating a schematic configuration of a brake pedal device of a first embodiment.

Hereinafter, a vehicular operation pedal device according to the present invention will be described with reference to the drawings on the basis of an embodiment implemented in a brake pedal device for a normal brake. In the drawings used in the following description, a part of a basic configuration is omitted, and a dimensional ratio and the like of each drawn part are not always accurate.

Figure 2:
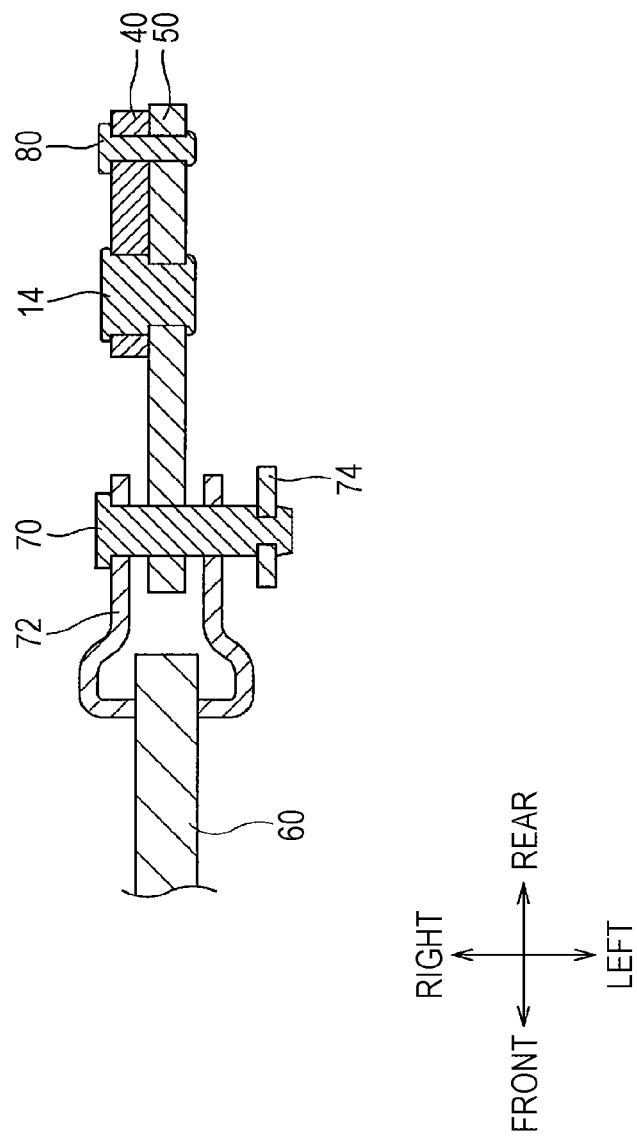
FIG. 2 is a view illustrating a cross-section of the brake pedal device cut along a line A-A of FIG. 1.
Figure 7:
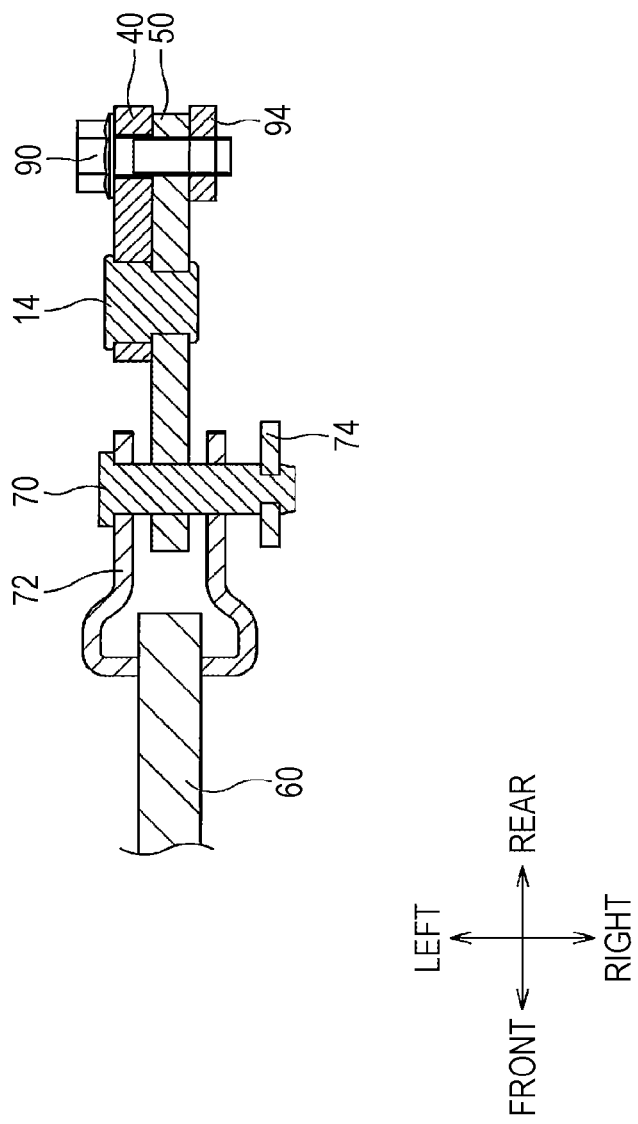
FIG. 7 is a view illustrating a cross-section of the brake pedal device cut along a line B-B of FIG. 6.
Figure 8:
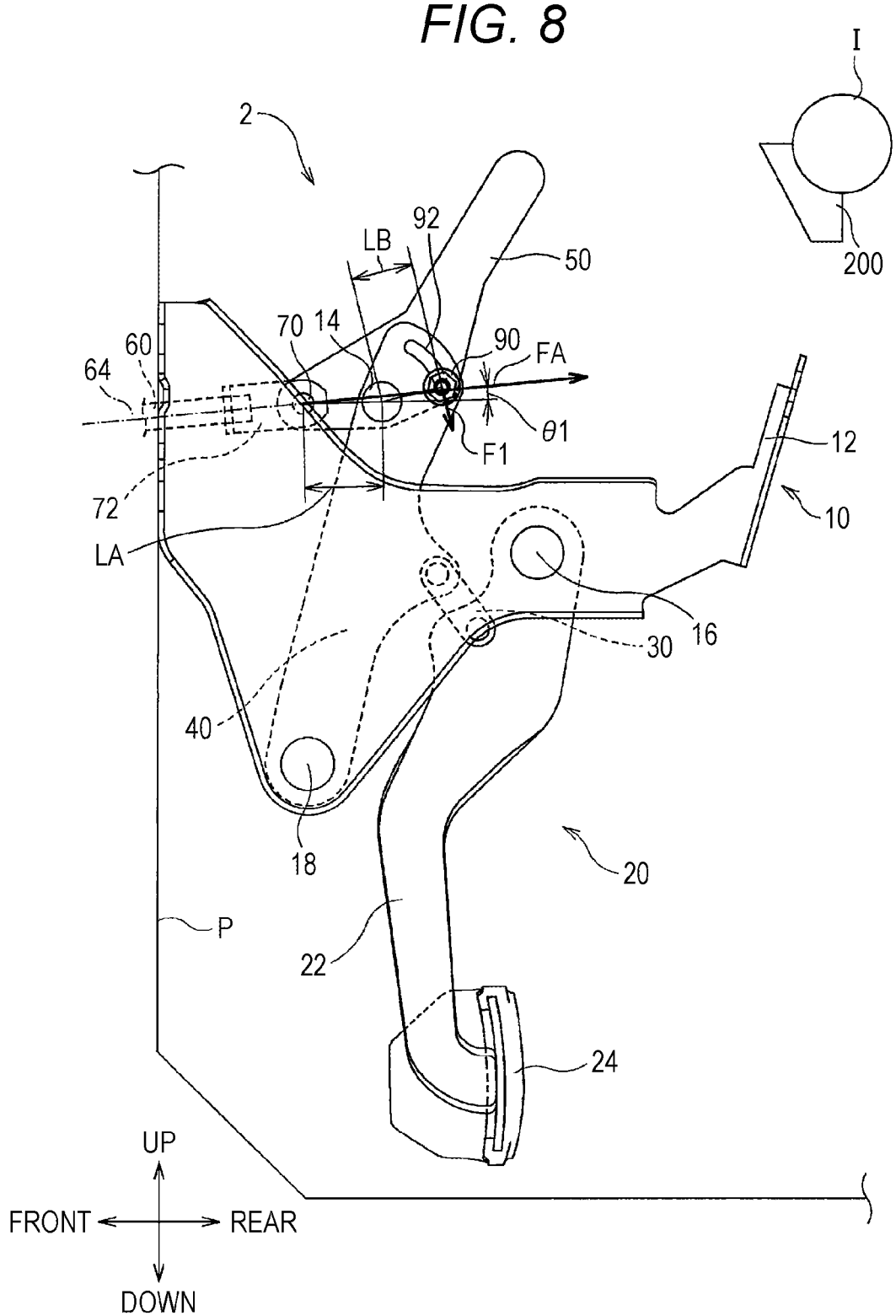
FIG. 8 is a side view illustrating the schematic configuration of the brake pedal device.
Figure 9:
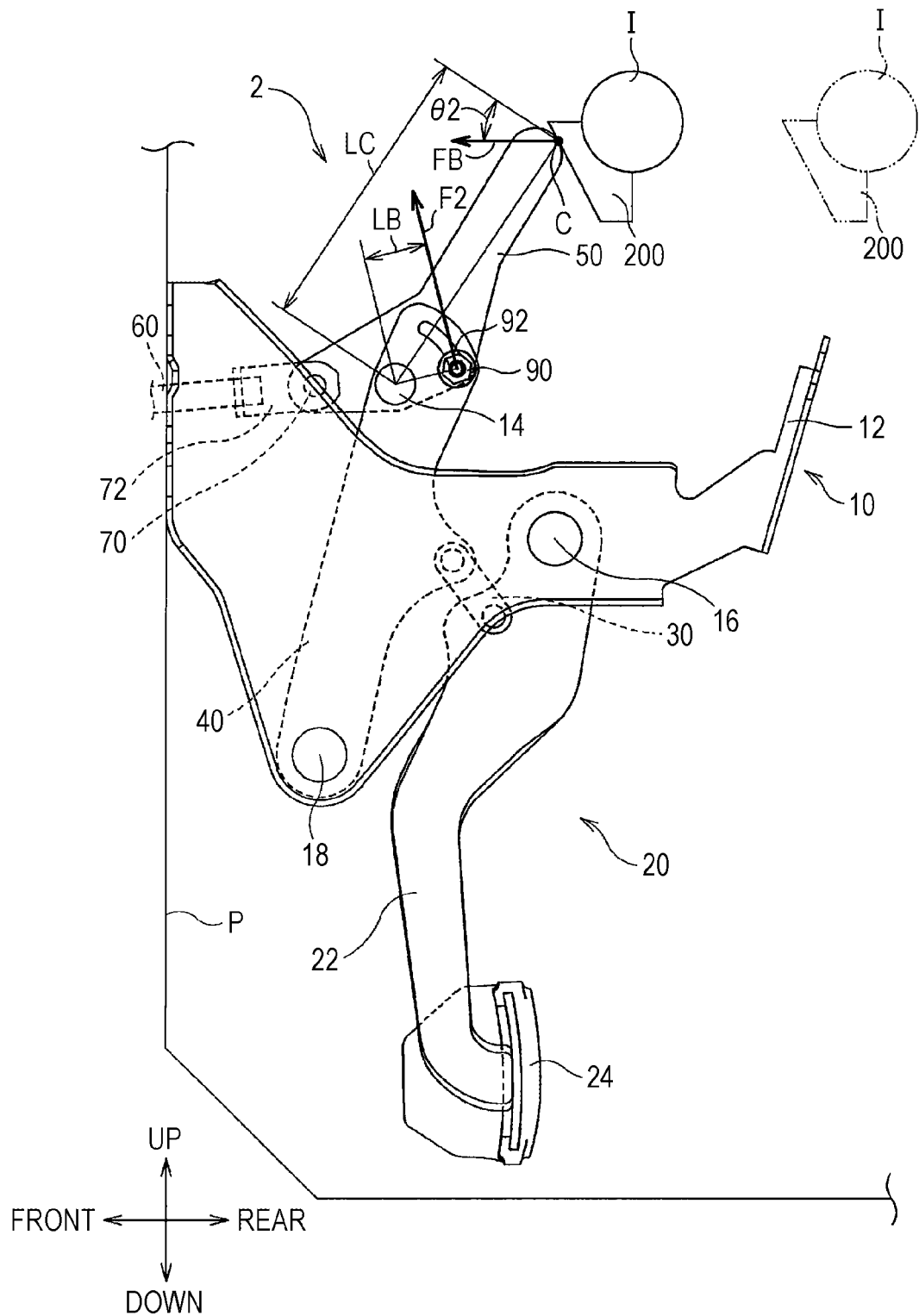
FIG. 9 is a side view illustrating the schematic configuration of the brake pedal device.

In the drawings, a front-rear direction, an up-down direction, and a left-right direction are as described in the drawings. However, in FIGS. 1, 3 to 6, and 8 to 12, a back side of paper surface of the drawing is a right direction, and a front side of the paper surface of the drawing is a left direction. In FIG. 2, the back side of the paper surface of the drawing is a downward direction, and the front side of the paper surface of the drawing is an upward direction. In FIG. 7, the back side of the paper surface of the drawing is the upward direction, and the front side of the paper surface of the drawing is the downward direction.

In the following description, a front direction is described as a "vehicle front side", a rear direction is described as a "vehicle rear side", the upward direction is described as a "vehicle upper side", and the downward direction is described as a "vehicle lower side". In addition, the left-right direction is described as a "vehicle width direction".

(1-1) Overview of First Embodiment

First, a first embodiment will be described. As illustrated in FIGS. 1 and 2, a brake pedal device 1 of the first embodiment is made of metal and includes a pedal bracket 10, an operation pedal mechanism 20, a rotating member 50, a caulking pin 80, and the like.

The pedal bracket 10 has a pair of side plates 12. The pair of side plates 12 face each other at a predetermined interval in the vehicle width direction, and are fixed to a dash panel P with bolts or the like. The dash panel P constitutes a part of the vehicle and is located on the vehicle front side from the operation pedal mechanism 20. The operation pedal mechanism 20, the rotating member 50, the caulking pin 80, and the like are arranged between the pair of side plates 12.

In FIG. 1, of the pair of side plates 12, the side plate 12 on the left side in the vehicle width direction is illustrated, and the side plate 12 on the right side in the vehicle width direction is not illustrated. This point is the same in FIGS. 3 to 6 and 8 to 12 described below.

The operation pedal mechanism 20 is a so-called link type operation pedal mechanism, and includes an operation pedal 22, a link member 30, an intermediate lever 40, and the like. The operation pedal 22 is rotatably supported with respect to the pedal bracket 10 by an operating shaft portion 16 provided at an upper end portion 22A of the operation pedal. A step portion 24 is provided on a lower end portion 22B of the operation pedal 22. Thus, the step portion 24 is rotatable with respect to the pedal bracket 10 and can be stepped forward of the vehicle by a driver of the vehicle (hereinafter, referred to as a "stepping operation"). The vehicle is controlled according to an amount of operation (pedal stroke, pedaling force, or the like) by the stepping operation.

The intermediate lever 40 is rotatably supported with respect to the pedal bracket 10 by an intermediate shaft portion 18 provided at a lower end portion 40B of the intermediate lever 40. A rotating shaft portion 14 and the caulking pin 80 are provided at an upper end portion 40A of the intermediate lever 40. An intermediate portion 40C of the intermediate lever 40 is connected to the operation pedal 22 by the link member 30, between the upper end portion 22A and the lower end portion 22B of the operation pedal 22.

The link member 30 has a first link pin 32 and a second link pin 34. The first link pin 32 is provided at a vehicle rear portion of the link member 30, and connects the link member 30 and the operation pedal 22. On the other hand, the second link pin 34 is provided in a vehicle front portion of the link member 30, and connects the link member 30 and the intermediate lever 40.

The rotating member 50 is a metal plate material and has an L-shape when viewed from the left side in the vehicle width direction. The rotating member 50 has a bent portion 52, a front end portion 54, and an upper end portion 56.

The bent portion 52 of the rotating member 50 is a central portion of the rotating member 50, and is a bent portion of the rotating member 50. The above-mentioned rotating shaft portion 14 and caulking pin 80 are provided in the bent portion 52.

The rotating shaft portion 14 and the caulking pin 80 are caulked so as not to come off from the bent portion 52 of the rotating member 50 and the upper end portion 40A of the intermediate lever 40. Thus, the rotating shaft portion 14 and the caulking pin 80 fix the rotating member 50 to the intermediate lever 40. Strength of the caulking pin 80 is made smaller than that of the rotating shaft portion 14. For example, as illustrated in FIG. 2, shear strength of the caulking pin 80 is made smaller than that of the rotating shaft portion 14 by making shaft diameter of the caulking pin 80 smaller than that of the rotating shaft portion 14. Alternatively, the caulking pin 80 may be made of a material having a tensile strength less than that of material of the rotating shaft portion 14. Therefore, when the caulking pin 80 is cut off and thus the caulking pin 80 comes off from the rotating member 50 and the intermediate lever 40, the rotating member 50 can rotate with respect to the intermediate lever 40 about the rotating shaft portion 14. The rotating shaft portion 14 is provided with a step slightly greater than a plate thickness of the intermediate lever 40, so that frictional resistance when the intermediate lever 40 rotates is reduced.

Note that the rotating member 50 is on the left side in the vehicle width direction and the intermediate lever 40 is on the right side in the vehicle width direction, however, unlike the first embodiment, the rotating member 50 may be on the right side in the vehicle width direction and the intermediate lever 40 may be on the left side in the vehicle width direction.

The front end portion 54 of the rotating member 50 is a portion of the rotating member 50 extending forward of the vehicle from the bent portion 52. At the front end portion 54, a tip portion 62 of an operating rod 60 is rotatably held via a connecting pin 70 and a clevis 72. Further, the rotating shaft portion 14 and the caulking pin 80 are provided on an axis 64 of the operating rod 60. However, the caulking pin 80 may not be provided on the axis 64 of the operating rod 60.

The operating rod 60 projects rearward of the vehicle from the dash panel P, and a projecting direction thereof can be freely changed. The connecting pin 70 is prevented from coming off from the front end portion 54 of the rotating member 50 and the clevis 72 by a clip 74 (see FIG. 2).

The upper end portion 56 of the rotating member 50 is a portion of the rotating member 50 extending upward of the vehicle from the bent portion 52. On the vehicle rear side from the upper end portion 56, there is an elongated instrument panel reinforcement I provided so that a longitudinal direction thereof is in the vehicle width direction. Therefore, the instrument panel reinforcement I is located on the vehicle rear side from the dash panel P. The instrument panel reinforcement I constitutes a part of the vehicle, and has a collision bracket 200 and the like. The collision bracket 200 is fixedly installed from the front end portion to the lower end portion of the instrument panel reinforcement I. The collision bracket 200 is provided to contact the upper end portion 56 of the rotating member 50 at the time of the vehicle collision. On the vehicle front side of the collision bracket 200, a contact surface portion for contacting the upper end portion 56 of the rotating member 50 is provided so that the rotating member 50 can be easily displaced forward of the vehicle. In the rotating member 50, the upper end portion 56 extends in a direction in which there is the instrument panel reinforcement I from the axis 64 of the operating rod 60, and a portion that contacts the contact surface portion of the collision bracket 200 has a curved shape.

Note that the rotating shaft portion 14, the operating shaft portion 16, the intermediate shaft portion 18, the first link pin 32, the second link pin 34, the connecting pin 70, and the caulking pin 80 are provided in a state of being substantially horizontal and substantially parallel to the vehicle width direction, between the pair of side plates 12.

(1-2) Operation of First Embodiment During Stepping Operation

Figure 3:
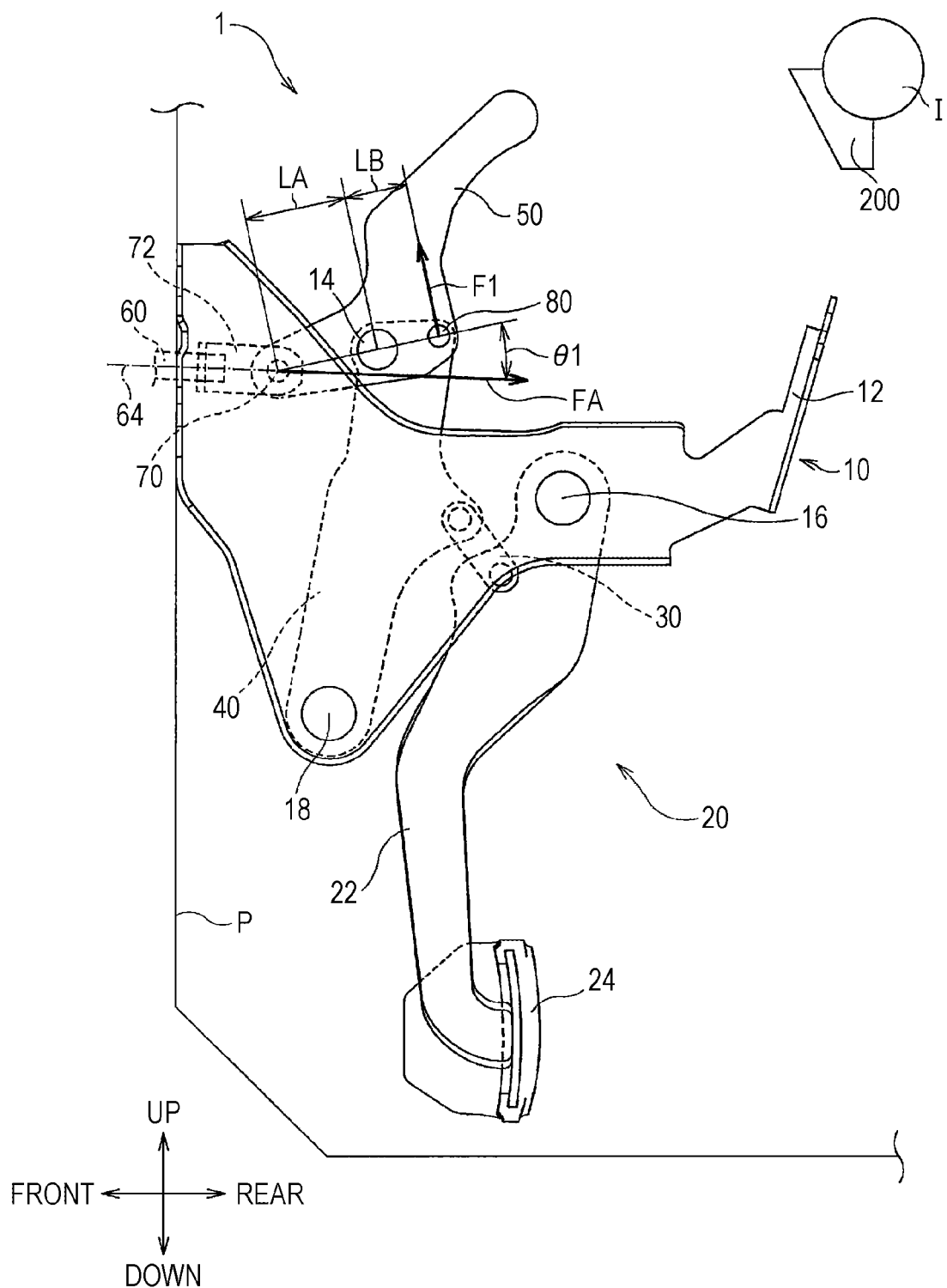
FIG. 3 is a side view illustrating the schematic configuration of the brake pedal device.

As illustrated in FIG. 3, when the stepping operation is performed, the step portion 24 is stepped forward of the vehicle, so that the operation pedal 22 rotates about the operating shaft portion 16. At this time, since the operation pedal 22 rotates in a predetermined direction (clockwise direction in FIG. 3) about the operating shaft portion 16, rotation of the operation pedal 22 is transmitted to the intermediate lever 40 via the link member 30.

Therefore, the intermediate lever 40 rotates in a predetermined direction (counterclockwise direction in FIG. 3) about the intermediate shaft portion 18 as the operation pedal 22 rotates. Therefore, the rotating member 50 and the operating rod 60 are displaced forward of the vehicle.

At that time, the caulking pin 80 is displaced upward of the vehicle from the axis 64 of the operating rod 60. Therefore, a load is applied to the caulking pin 80. For example, when a reaction force FA from the operating rod 60 is applied to the connecting pin 70 by the step portion 24 being stepped forward of the vehicle by the driver to the maximum, a first load F1 applied to the caulking pin 80 is represented by the following Equation (I).

$$F1 = FA \times \sin\theta1 \times LA/LB \qquad \text{Equation (I)}$$

Here, $\theta1$ refers to an angle at which a straight line connecting the connecting pin 70 and the caulking pin 80 intersects a direction of the reaction force FA in the connecting pin 70. LA refers to a distance from the connecting pin 70 to the rotating shaft portion 14. LB refers to a distance from the rotating shaft portion 14 to the caulking pin 80.

Note that in a case where the step portion 24 is stepped forward of the vehicle by the driver to the maximum, when an operating load applied to the step portion 24 is increased by the step portion 24 being further stepped forward of the vehicle by the driver, the reaction force FA is also increased, and the first load F1 is also increased. Therefore, in the present embodiment, the load applied to the caulking pin 80 when the operating load is the maximum in design is defined as the first load F1.

Note that when the operating rod 60 is displaced forward of the vehicle due to the stepping operation, an operating force during the stepping operation is transmitted to a brake device or a control device that controls an operating state of the vehicle through a hydraulic circuit, an electronic circuit, or the like.

(1-3) Operation of First Embodiment at the Time of Vehicle Collision

Figure 4:
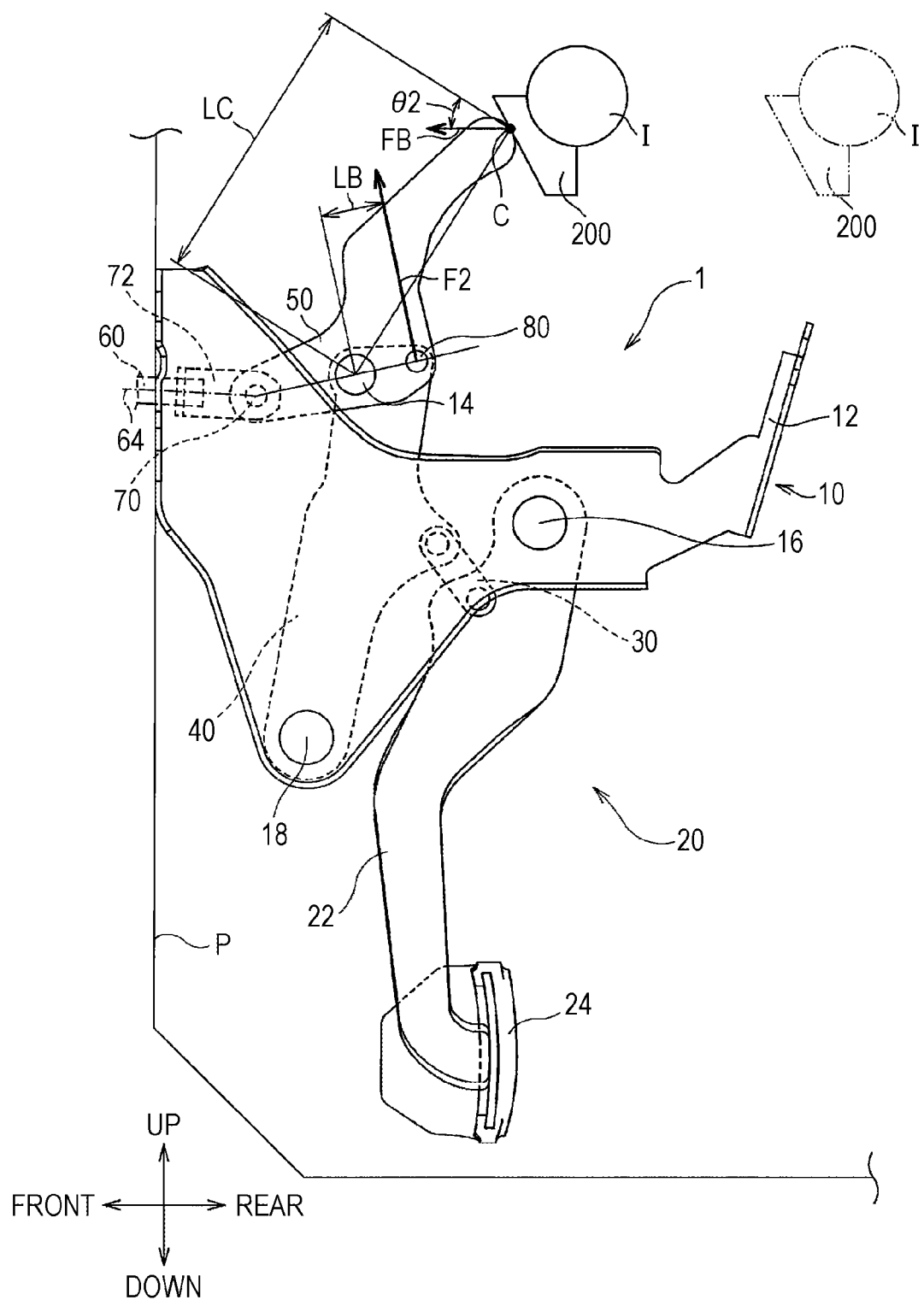
FIG. 4 is a side view illustrating the schematic configuration of the brake pedal device.

As illustrated in FIG. 4, when the dash panel P is displaced rearward of the vehicle at the time of the vehicle collision, the collision bracket 200 of the instrument panel reinforcement I contacts the rotating member 50. Even in such a case, the load is applied to the caulking pin 80. For example, when a collision force FB is applied to the rotating member 50 at a contact point C where the collision bracket 200 and the rotating member 50 contact each other, a second load F2 applied to the caulking pin 80 is represented by the following Equation (II).

$$F2 = FB \times \cos\theta2 \times LC/LB \qquad \text{Equation (II)}$$

Here, θ2 refers to an angle at which a perpendicular line of a straight line connecting the contact point C and the rotating shaft portion 14 intersects a direction of the collision force FB at the contact point C. LC refers to a distance from the contact point C to the rotating shaft portion 14.

Note that the distances LA. LB, and LC are set so that the second load F2 is greater than the first load F1. Specifically, as illustrated in FIG. 4, when the distance LC is made longer than the distance LB, the second load F2 is greater than the first load F1 by leverage.

When the second load F2 exceeds a reference load larger than the first load F1, the caulking pin 80 is cut off by the second load F2, so that the caulking pin 80 comes off from the rotating member 50 and the intermediate lever 40. Thus, fixation of the rotating member 50 and the intermediate lever 40 by the caulking pin 80 is released.

Figure 5:
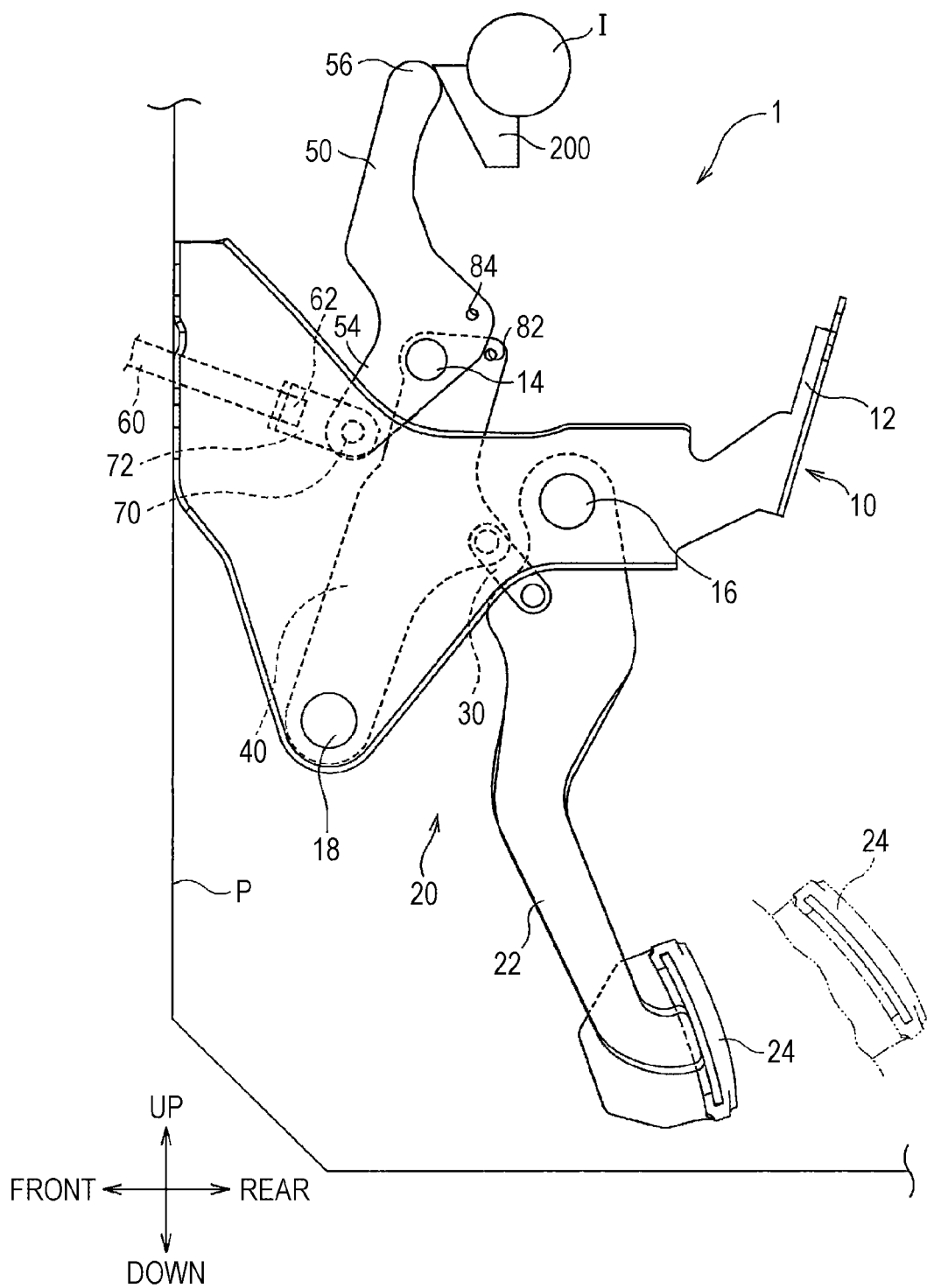
FIG. 5 is a side view illustrating the schematic configuration of the brake pedal device.
Figure 6:
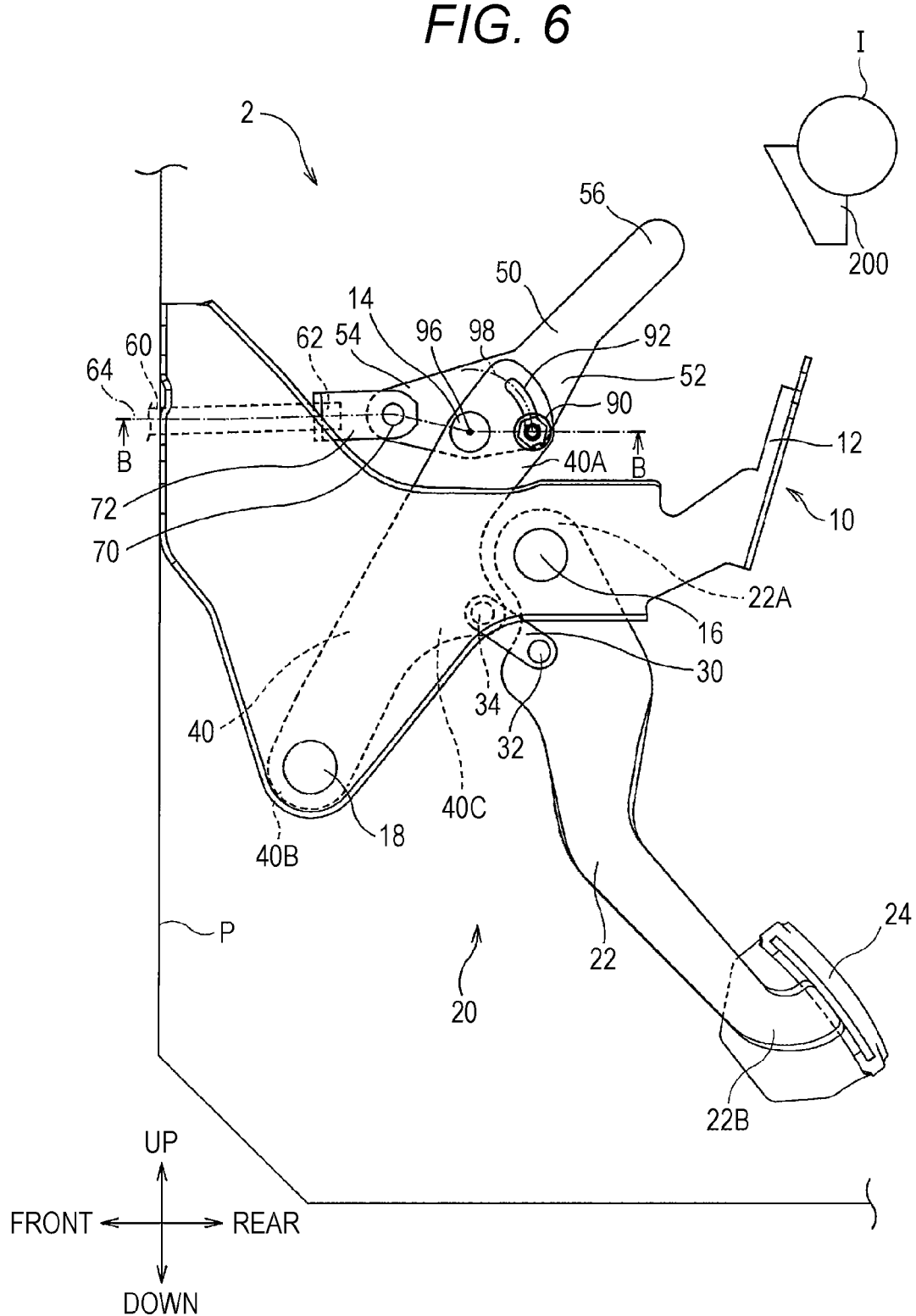
FIG. 6 is a side view illustrating the schematic configuration of the brake pedal device of a second embodiment.

Further, as illustrated in FIG. 5, the rotating member 50 is pushed forward of the vehicle by the collision bracket 200, so that the upper end portion 56 of the rotating member 50 is rotated forward (counterclockwise direction in FIG. 5) of the vehicle about the rotating shaft portion 14. At the same time, the front end portion 54 of the rotating member 50 and the tip portion 62 of the operating rod 60 are displaced downward of the vehicle via the connecting pin 70 and the clevis 72. At that time, since the intermediate lever 40 is rotated forward (counterclockwise direction in FIG. 5) of the vehicle, the step portion 24 of the operation pedal 22 is displaced forward of the vehicle.

Reference numerals 82 and 84 indicate mounting holes for inserting the caulking pin 80 therein. Further, the step portion 24 illustrated by a two-dot chain line indicates a position of the step portion 24 when the stepping operation is released.

(1-4) Summary of First Embodiment

As described above in detail, in the brake pedal device 1 of the first embodiment, the rotating member 50 and the caulking pin 80 are added to a so-called link type operation pedal mechanism 20, so that prevention of backward movement of the step portion 24 of the operation pedal mechanism 20 at the time of the vehicle collision is realized. That is, the brake pedal device 1 of the first embodiment has a small number of parts required for preventing the backward movement of the step portion 24 of the operation pedal mechanism 20 at the time of the vehicle collision.

Further, in the brake pedal device 1 of the first embodiment, since the rotating shaft portion 14 is provided on the axis 64 of the operating rod 60, the load applied to the caulking pin 80 is smaller than that in a case where the rotating shaft portion 14 is not provided on the axis 64 of the operating rod 60.

However, the rotating shaft portion 14 may not be provided on the axis 64 of the operating rod 60.

Further, in the brake pedal device 1 of the first embodiment, when the prevention of the backward movement of the step portion 24 of the operation pedal mechanism 20 at the time of the vehicle collision is realized, the tip portion 62 of the operating rod 60, the connecting pin 70, and the clevis 72 are displaced downward of the vehicle, but is not deformed. Therefore, in the brake pedal device 1 of the first embodiment, it is possible to stably realize the prevention of the backward movement of the step portion 24 of the operation pedal mechanism 20 at the time of the vehicle collision without receiving deformation resistance of the operating rod 60 or the like in the so-called link type operation pedal mechanism 20.

Further, in the brake pedal device 1 of the first embodiment, the caulking pin 80 facilitates the fixation of the rotating member 50 and the intermediate lever 40 and release of the fixation thereof.

(2-1) Overview of Second Embodiment

Next, a brake pedal device 2 of a second embodiment illustrated in FIGS. 6 to 10 will be described. FIGS. 6 to 10 correspond to FIGS. 1 to 5 of the first embodiment. In the following description, the same reference numerals will be given to components substantially in common with the first embodiment, and detailed description thereof will be omitted.

In the brake pedal device 2 of the second embodiment, unlike the first embodiment, the rotating member 50 is on the right side in the vehicle width direction, and the intermediate lever 40 is on the left side in the vehicle width direction. Note that in the same manner as in the first embodiment, the rotating member 50 may be on the left side in the vehicle width direction, and the intermediate lever 40 may be on the right side in the vehicle width direction.

Further, in the brake pedal device 2 of the second embodiment, the fixation of the rotating member 50 and the intermediate lever 40 and the release of the fixation thereof is realized by a bolt 90 and a nut 94 instead of the caulking pin 80 of the first embodiment. Therefore, the bolt 90 having a strength similar to that of the rotating shaft portion 14 is used.

Further, the upper end portion 40A of the intermediate lever 40 is provided with an elongated hole 92 into which the bolt 90 is inserted at a position in which it overlaps the bent portion 52 of the rotating member 50 in the vehicle width direction. The elongated hole 92 is formed along an arc 98 about a center point 96 of the rotating shaft portion 14. However, the elongated hole 92 may be provided in the bent portion 52 of the rotating member 50 instead of in the upper end portion 40A of the intermediate lever 40.

The bolt 90 is inserted through the elongated hole 92 of the intermediate lever 40 and the bent portion 52 of the rotating member 50, and is brought into contact with a lower end of the elongated hole 92. The nut 94 is screwed into the bolt 90 in such a state from a tip of the bolt 90. Thus, the rotating member 50 is fixed to the intermediate lever 40 by a fastening force of the bolt 90 and the nut 94. Further, the first load F1 and the second load F2 are applied to the bolt 90.

Note that the bolt 90 is located on the vehicle lower side from the axis 64 of the operating rod 60, but it may be located on the axis 64 of the operating rod 60, or on the vehicle upper side from the axis 64 of the operating rod 60.

Further, in the brake pedal device 2 of the second embodiment, the rotating shaft portion 14 is provided on the vehicle lower side from the axis 64 of the operating rod 60. Thus, the first load F1 is applied in a direction (downward of the vehicle) opposite to that in the first embodiment.

The fastening force of the bolt 90 and the nut 94 is made smaller than the above reference load and strength of the rotating shaft portion 14. Therefore, when the second load F2 exceeds the above reference load, the bolt 90 moves in the elongated hole 92 of the rotating member 50 from the lower end toward an upper end of the elongated hole 92 with the nut 94 screwed therein. Therefore, the upper end portion 56 of the rotating member 50 is rotated forward (counterclockwise direction in FIGS. 6 and 8 to 10) of the vehicle about the rotating shaft portion 14. At the same time, the front end portion 54 of the rotating member 50 and the tip portion 62 of the operating rod 60 are displaced downward of the vehicle via the connecting pin 70 and the clevis 72.

Figure 10:
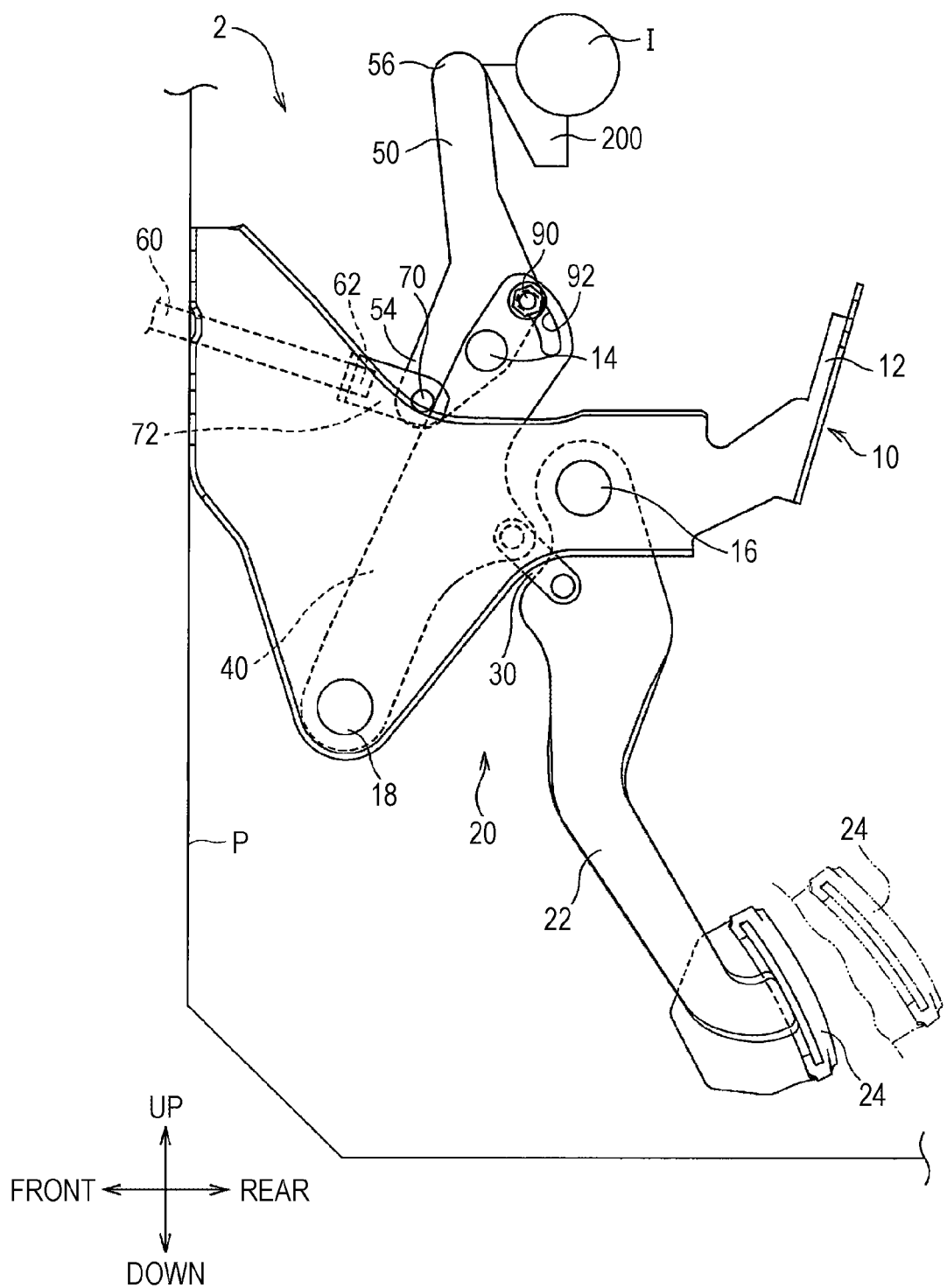
FIG. 10 is a side view illustrating the schematic configuration of the brake pedal device.

Further, as illustrated in FIG. 10, after the bolt 90 contacts the upper end of the elongated hole 92 of the rotating member 50, the rotating member 50 is pushed forward of the vehicle by the collision bracket 200. Therefore, the upper end portion 56 of the rotating member 50 is rotated forward (counterclockwise direction in FIGS. 6 and 8 to 10) of the vehicle about the rotating shaft portion 14. At the same time, the front end portion 54 of the rotating member 50 and the tip portion 62 of the operating rod 60 are displaced downward of the vehicle via the connecting pin 70 and the clevis 72. At that time, the bolt 90 is in contact with the upper end of the elongated hole 92 of the intermediate lever 40, and the intermediate lever 40 is rotated forward (counterclockwise direction in FIGS. 6 and 8 to 10) of the vehicle about the intermediate shaft portion 18, and thus the step portion 24 of the operation pedal 22 is displaced forward of the vehicle.

(2-2) Summary of Second Embodiment

As described above in detail, in the brake pedal device 2 of the second embodiment, the rotating member 50, the bolt 90, and the nut 94 are added to the so-called link type operation pedal mechanism 20, so that the prevention of the backward movement of the step portion 24 of the operation pedal mechanism 20 at the time of the vehicle collision is realized. That is, the brake pedal device 2 of the second embodiment has a small number of parts required for preventing the backward movement of the step portion 24 of the operation pedal mechanism 20 at the time of the vehicle collision.

Further, in the brake pedal device 2 of the second embodiment, when the prevention of the backward movement of the step portion 24 of the operation pedal mechanism 20 at the time of the vehicle collision is realized, the tip portion 62 of the operating rod 60, the connecting pin 70, and the clevis 72 are displaced downward of the vehicle, but is not deformed. Therefore, in the brake pedal device 2 of the second embodiment, it is possible to stably realize the prevention of the backward movement of the step portion 24 of the operation pedal mechanism 20 at the time of the vehicle collision without receiving the deformation resistance of the operating rod 60 or the like in the so-called link type operation pedal mechanism 20.

Furthermore, in the brake pedal device 2 of the second embodiment, the fixation of the rotating member 50 and the intermediate lever 40 and the release of the fixation thereof is realized by the fastening force of the bolt 90 and the nut 94. Further, the first load F1 to the vehicle lower side is applied to the bolt 90 during the stepping operation, so that the bolt 90 is maintained in a state of being in contact with the lower end of the elongated hole 92. Therefore, even after the fixation of the rotating member 50 and the intermediate lever 40 is released, if the stepping operation is performed, the rotating member 50 and the operating rod 60 are displaced forward of the vehicle, so that safety is further improved.

(3-1) Overview of Third Embodiment

Figure 11:
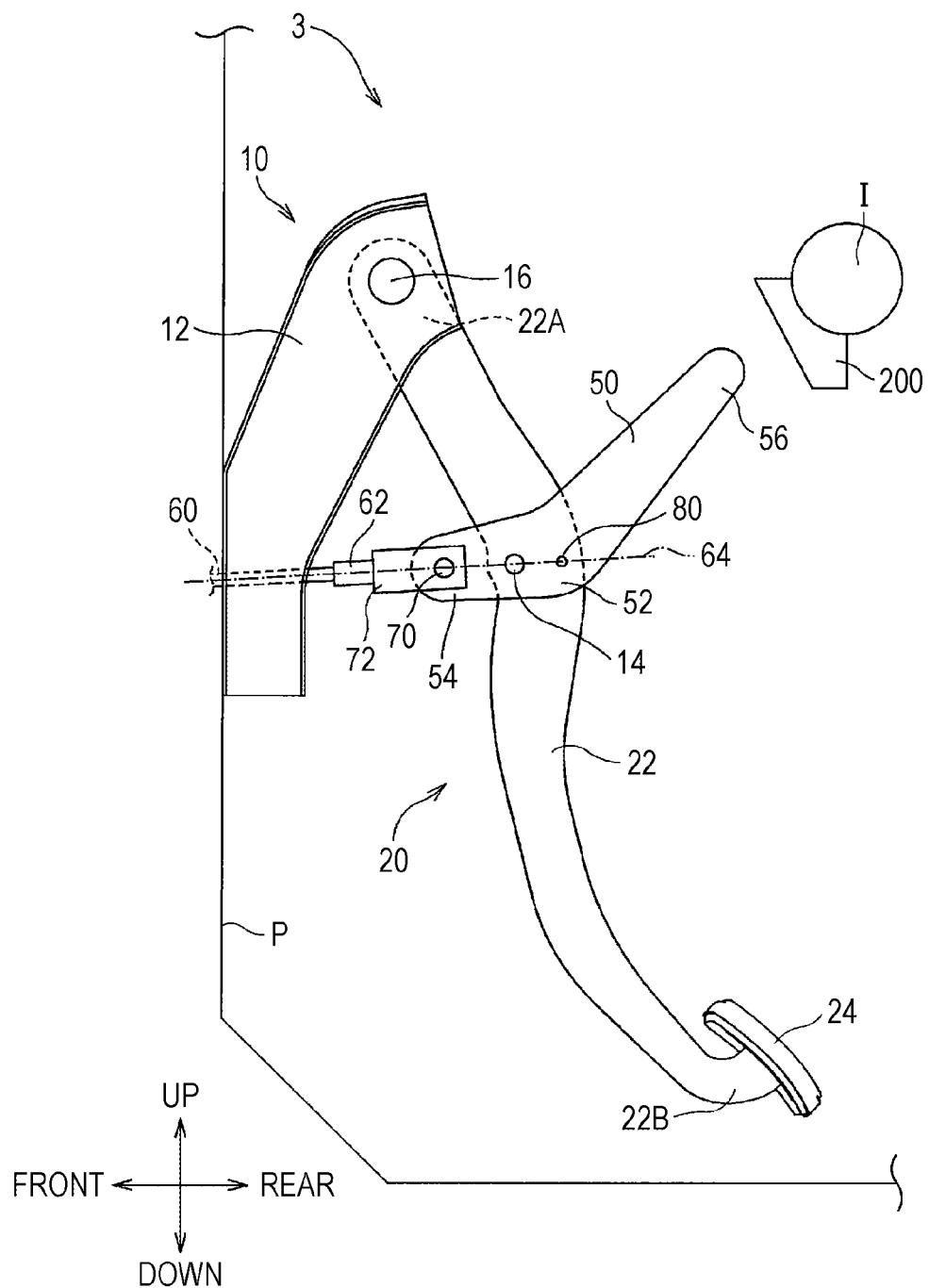
FIG. 11 is a side view illustrating the schematic configuration of the brake pedal device of a third embodiment.
Figure 12:
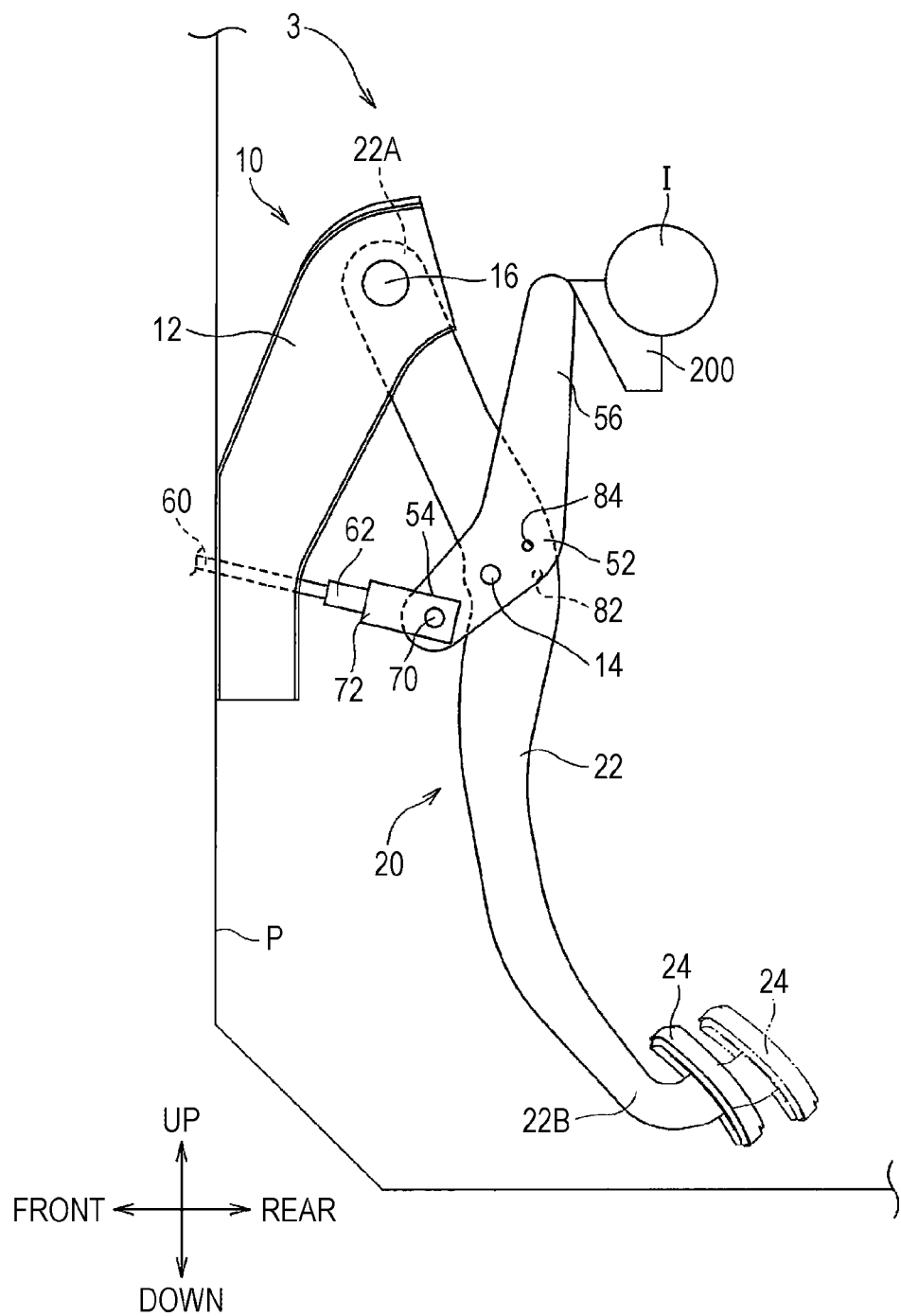
FIG. 12 is a side view illustrating the schematic configuration of the brake pedal device.

Next, a brake pedal device 3 of a third embodiment illustrated in FIGS. 11 and 12 will be described. FIGS. 11 and 12 correspond to FIGS. 1 and 5 of the first embodiment. In the following description, the same reference numerals will be given to the components substantially in common with the first embodiment, and detailed description thereof will be omitted.

In the brake pedal device 3 of the third embodiment, the operation pedal mechanism 20 does not include the link member 30 and the intermediate lever 40 of the first embodiment. Therefore, the rotating shaft portion 14 and the caulking pin 80 fix an obtuse-angled V-shaped rotating member 50 to the operation pedal 22. Thus, the rotating shaft portion 14 and the caulking pin 80 are provided between the upper end portion 22A and the lower end portion 22B of the operation pedal 22.

(3-2) Summary of Third Embodiment

Therefore, in the brake pedal device 3 of the third embodiment, the rotating member 50 and the caulking pin 80 are added to the operation pedal mechanism 20 which does not include the link member 30 and the intermediate lever 40 of the first embodiment, so that the prevention of the backward movement of the step portion 24 of the operation pedal mechanism 20 at the time of the vehicle collision is realized. That is, the brake pedal device 3 of the third embodiment has a small number of parts required for preventing the backward movement of the step portion 24 of the operation pedal mechanism 20 at the time of the vehicle collision.

Further, in the brake pedal device 3 of the third embodiment, since the rotating shaft portion 14 is provided on the axis 64 of the operating rod 60, the load applied to the caulking pin 80 is smaller than that in the case where the rotating shaft portion 14 is not provided on the axis 64 of the operating rod 60.

Further, in the brake pedal device 3 of the third embodiment, when the prevention of the backward movement of the step portion 24 of the operation pedal mechanism 20 at the time of the vehicle collision is realized, the tip portion 62 of the operating rod 60, the connecting pin 70, and the clevis 72 are displaced downward of the vehicle, but is not deformed. Therefore, in the brake pedal device 3 of the third embodiment, it is possible to stably realize the prevention of the backward movement of the step portion 24 of the operation pedal mechanism 20 at the time of the vehicle collision without receiving the deformation resistance of the operating rod 60 or the like in the so-called link type operation pedal mechanism 20.

Further, in the brake pedal device 3 of the third embodiment, the caulking pin 80 facilitates the fixation of the rotating member 50 and the operation pedal 22 and the release of the fixation thereof.

(4) Others

By the way, in each embodiment, the brake pedal devices 1, 2 and 3 are examples of the "vehicular operation pedal device". The pedal bracket 10 is an example of a "support member". The operating rod 60 is an example of a "vehicular control mechanism". The tip portion 62 of the operating rod 60 is an example of an "input portion of the vehicular control mechanism". The connecting pin 70 and the clevis 72 are examples of a "connecting portion". The dash panel P is an example of a "first vehicle component". The instrument panel reinforcement I and the collision bracket 200 are examples of a "second vehicle component".

(5) Modification

Note that the present invention is not limited to the above embodiments, and various modifications can be made without departing from the spirit of the present invention.

For example, in the brake pedal device 3 of the third embodiment, the fixation of the rotating member 50 and the operation pedal 22 and the release of the fixation thereof may be realized by the bolt 90 and the nut 94 of the second embodiment instead of the caulking pin 80.

Further, in the embodiments, when the stepping operation is performed, the caulking pin 80 or the bolt 90 is displaced upward, but it may be displaced downward.

Furthermore, in the embodiments, the present invention is applied to the operation pedal 22 as the brake pedal, but the present invention may be applied to each pedal (for example, an accelerator pedal or a clutch pedal) used in the vehicle.

Parts of the brake pedal devices 1, 2 and 3 of the embodiments are not limited to those made of metal, and may be made of resin.

LIST OF REFERENCE SIGNS 1, 2, 3: Brake pedal device (Vehicular operation pedal device), 10: Pedal bracket (Support member), 14: Rotating shaft portion, 16: Operating shaft portion, 18: Intermediate shaft portion, 20: Operation pedal mechanism, 22: Operation pedal, 22A: Upper end portion of operation pedal, 22B: Lower end portion of operation pedal, 24: Step portion, 30: Link member, 40: Intermediate lever, 40A: Upper end portion of intermediate lever, 40B: Lower end portion of intermediate lever, 40C: Intermediate portion of intermediate lever, 50: Rotating member, 52: Bent portion of rotating member, 54: Front end portion of rotating member, 56: Upper end portion of rotating member, 60: Operating rod (Vehicular control mechanism), 62: Tip portion of operating rod (Input portion of vehicular control mechanism), 64: Axis of operating rod, 70: Connecting pin (Connecting portion), 72: Clevis (Connecting portion), 80: Caulking pin, 82: Mounting hole, 84: Mounting hole, 90: Bolt, 92: Elongated hole, 94: Nut, 96: Center of rotating shaft portion, 98: Arc, 200: Collision bracket (Second vehicle component), F1: First load, F2: Second load, I: Instrument panel reinforcement (Second vehicle component), P: Dash panel (First vehicle component).

What is claimed is:

1. A vehicular operation pedal device comprising:
a support member fixed to a first vehicle component;
an operation pedal mechanism provided in the support member and having a step portion rotatable with respect to the support member, and in which the step portion is stepped forward of a vehicle;
a rotating member having a bent portion, a front end portion extending forward of the vehicle from the bent portion, and an upper end portion extending upward from the bent portion, and rotatably supported with respect to the operation pedal mechanism by a rotating shaft portion at the bent portion;
a connecting portion that rotatably holds an input portion of a vehicular control mechanism projecting rearward of the vehicle from the first vehicle component with respect to the rotating member, at the front end portion of the rotating member; and
a fixing member that fixes the rotating member and the operation pedal mechanism at the bent portion of the rotating member, and to which a first load is applied when the step portion of the operation pedal mechanism is fully stepped forward of the vehicle, wherein
the operation pedal mechanism comprises:
an operation pedal that is rotatably supported with respect to the support member by an operating shaft portion provided at an upper end portion of the operation pedal and is provided with the step portion at a lower end portion of the operation pedal; and
an intermediate lever that is rotatably supported with respect to the support member by an intermediate shaft portion provided at a lower end portion of the intermediate lever, and is provided with the rotating shaft portion and the fixing member at an upper end portion of the intermediate lever, in which an intermediate portion of the intermediate lever is connected to the operation pedal by a link member, between the upper end portion and the lower end portion of the operation pedal,
an amount of operation by stepping on the step portion is transmitted to the vehicular control mechanism via the rotating member and the connecting portion,
when the first vehicle component is displaced rearward of the vehicle at the time of a vehicle collision, the upper end portion of the rotating member comes into contact with a second vehicle component disposed rearward of the vehicle from the first vehicle component, so that a second load is applied to the fixing member, and
when the second load is greater than the first load, fixation of the rotating member and the operation pedal mechanism by the fixing member is released, the upper end portion of the rotating member is rotated forward of the vehicle about the rotating shaft portion, and the front end portion of the rotating member and the input portion of the vehicular control mechanism are displaced downward via the connecting portion, so that the step portion of the operation pedal mechanism is displaced forward of the vehicle with respect to the first vehicle component.

2. The vehicular operation pedal device according to claim 1, wherein the input portion of the vehicular control mechanism is a tip portion of an operating rod, and controls the vehicle by being displaced in an axial direction of the operating rod by an operating load on the step portion, and the rotating shaft portion is disposed on an axis of the operating rod.

3. The vehicular operation pedal device according to claim 1, wherein the fixing member is a caulking pin that restricts rotation of the rotating member with respect to the operation pedal mechanism by caulking while being inserted through a mounting hole provided in the operation pedal mechanism and a mounting hole provided in the rotating member.

4. The vehicular operation pedal device according to claim 1, wherein the fixing member comprises:

a bolt inserted into an elongated hole formed along an arc about the rotating shaft portion at the bent portion of the rotating member; and a nut screwed into the bolt.

* * * * *